Patented July 5, 1932

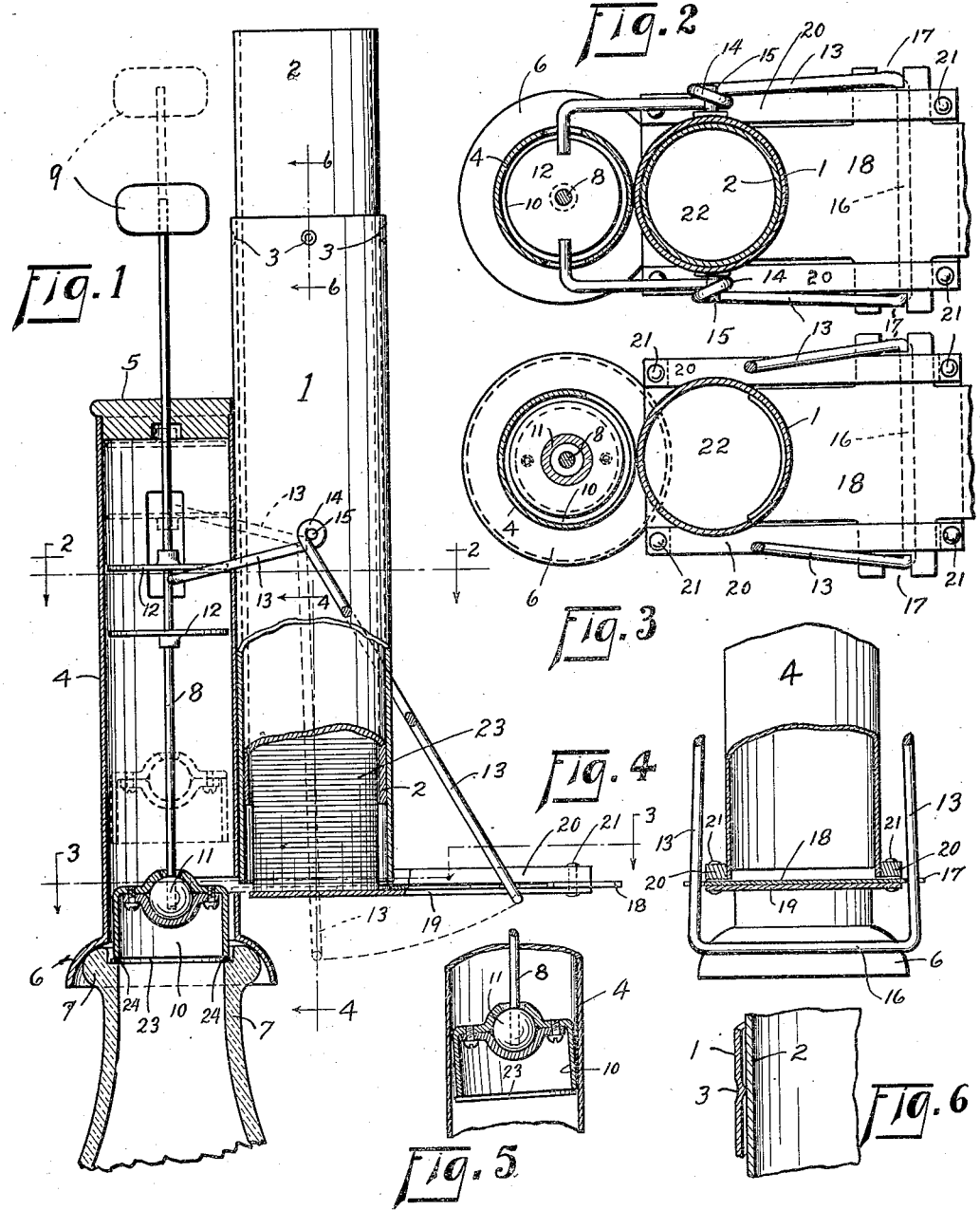

1,866,255

UNITED STATES PATENT OFFICE

LA ROY E. GREENMAN, OF KALKASKA, MICHIGAN

BOTTLE CAPPER

Application filed May 3, 1930. Serial No. 449,379.

The present invention relates to bottle cappers and more particularly to devices for capping milk bottles.

The main objects of the invention are to provide a milk bottle capper which can be economically manufactured, a milk bottle capper which is readily portable, and a milk bottle capper which is convenient, effective and efficient in use; to provide a capping device of the character above indicated having a capping head or plunger provided with a semi-universal joint for purposes hereinafter indicated; to provide a device of this character having means for maintaining the cylindrical cap magazine at adjustable predetermined heights with respect to the cap cylinder; and, to provide a generally improved milk bottle capper having novel features other than those above indicated.

An illustrative embodiment of the invention is shown in the accompanying drawing, wherein:

Figure 1 is a side elevational view of the capper and the neck portion of a milk bottle, partly in vertical section and showing other parts thereof broken away to better show the operating mechanism;

Figure 2 is a sectional view thereof on line 2—2 of Figure 1;

Figure 3 is another sectional view on line 3—3 of Figure 1;

Figure 4 is a fragmentary front elevational view, part of the plunger cylinder being broken away;

Figure 5 is a fragmentary vertical sectional view of the device showing the capping head and its semi-universal joint connection with the plunger stem; and Figure 6 is a fragmentary sectional view on line 6—6 of Figure 1.

Referring to the drawing, a vertically disposed tubular cap cylinder 1, adapted to hold a tubular milk bottle cap magazine 2 of conventional form, is provided adjacent its upper end with a plurality of indented portions or bosses 3 adapted to engage the outer wall of the cap magazine for maintaining the magazine at variable adjusted predetermined heights with respect to its cylindrical container and best shown in Figure 6.

Secured to and adjacent the cap cylinder 1 is a vertically disposed plunger cylinder 4 whose upper end is closed by a detachably secured cover 5 and whose lower end is provided with a flared skirt 6 adapted to rest upon the neck of a milk bottle 7. A reciprocating plunger within the plunger cylinder is provided with a stem 8 to whose outer end is secured an operating handle or knob 9 and to whose lower end is secured a capping head 10 having a semi-universal joint connection 11 with the stem 8. A pair of spaced discs 12, are carried by the stem intermediate its ends and between these discs, the open ends of yoke-shaped bell-crank lever 13 are operatively positioned.

The bell-crank lever is pivotally connected intermediate its ends by means of its loop bearings 14 which embrace the laterally projecting pins 15 secured to the cap cylinder. The yoke portion 16 of the bell-crank lever is embraced between notched or toothed portions 17 of a reciprocating cap feed plate 18.

This feed plate is slidably carried on a horizontally disposed floor plate 19, secured adjacent the bottom of the cap cylinder 1 by means of a pair of spaced parallel strips 20 to which the floor plate is secured as by rivets 21. These spaced parallel strips are soldered or are otherwise rigidly secured to the cap cylinder 1.

The feed plate 18 is provided with a circular well 22 of substantially the same diameter as a milk bottle cap and which it is adapted to singly feed from the cap cylinder 1 to the plunger cylinder 4.

In the position of the operating handle 9 and its cooperating lever 13 shown in full lines in Figure 1, the well 22 of the feed plate 18, is positioned to receive a single milk bottle cap therein from the plurality of vertically stacked gravity fed caps 23 immediately thereabove and within the cap cylinder 1.

In operation, the flared skirt portion 6 of the plunger cylinder is placed on the neck of the milk bottle 7 as indicated in Figure 1. The operating handle is then raised to the position indicated in dotted lines and the upward movement of the plunger stem 8 carries with it the capping head 10 and the spaced discs 12 between which discs the open ends of the bell-crank lever 13 are positioned. This lifting movement of the operating handle causes the bell-crank lever to pivot on the pin bearings 15, assume the position indicated in dotted lines and co-operatively function to slide the cap feed plate 18 into the plunger cylinder 4 to deliver therein a single cap 23 which drops from its well by gravity to the bottle 7. By pressing down on the operating handle, the feed plate 18 is obviously thereby withdrawn and the capping head 10 descends within its cylinder to seat the cap 23 therein upon the cap receiving seat 24 of the bottle.

By providing the semi-universal joint connection between the plunger stem and the capping head, the head always assumes a lateral displacement. The device in the hands of its operator therefore need not be absolutely vertical and the bottles can therefore be quickly and conveniently capped.

It will thus be seen that a device of the character above outlined may be economically manufactured, is readily portable, and is convenient, effective and efficient in use.

While but one specific embodiment of this invention has been herein shown and described, it will be understood that numerous details of the construction shown may be altered or omitted without departing from the spirit of this invention as defined by the following claims.

I claim:

1. A milk bottle capping machine comprising a cap container, a plunger at one side of the cap container, a feed plate operable across the lower end of the cap container, a guide supporting and directing the feed plate in its movements, a yoke-shaped bell crank lever pivoted to opposite sides of the cap container and having an end portion extending beneath and along the sides of the said guide and engaging opposite sides of the feed plate, and having its opposite end terminating in transversely spaced elements at the sides of the plunger stem, and spaced disks carried by the stem of the plunger to engage the spaced elements of the lever and actuate the same.

2. A milk bottle capping machine comprising juxtaposed cylinders, the one containing the caps and the other projecting and terminating in a flared skirt to receive the neck of a milk bottle, a feed plate operable across the lower ends of the cylinders, a guide at the lower end of the cap containing cylinder supporting and directing the feed plate in its movements, a plunger in the cylinder terminating in the flared skirt, spaced disks on the stem of the plunger and housed within the plunger containing cylinder, and a yoke-shaped bell crank lever pivoted to the sides of the cap containing cylinder and having an end portion extending beneath and along the sides of the said guide and engaging opposite sides of the feed plate, and having its opposite end provided with inturned ends which pass through the sides of the plunger cylinder and terminate between the spaced disks to be engaged thereby.

In testimony whereof I have hereunto set my hand at Kalkaska, Michigan, this 1st day of May, 1930.

LA ROY E. GREENMAN.